(12) United States Patent
Carr (10) Patent No.: US 11,895,086 B1
(45) Date of Patent: Feb. 6, 2024

(54) DYNAMIC PREFIX APPORTIONMENT FOR ADDRESS POOL MANAGEMENT

(71) Applicant: Juniper Networks, Inc., Sunnyvale, CA (US)

(72) Inventor: Michael D. Carr, Riverside, RI (US)

(73) Assignee: Juniper Networks, Inc., Sunnyvale, CA (US)

(*) Notice: Subject to any disclaimer, the term of this patent is extended or adjusted under 35 U.S.C. 154(b) by 0 days.

(21) Appl. No.: 17/930,086

(22) Filed: Sep. 7, 2022

(51) Int. Cl.
*H04L 61/5061* (2022.01)

(52) U.S. Cl.
CPC .................. *H04L 61/5061* (2022.05)

(58) Field of Classification Search
CPC .. H04L 61/50; H04L 61/5007; H04L 61/5061
See application file for complete search history.

(56) References Cited

U.S. PATENT DOCUMENTS

| | | | | |
|---|---|---|---|---|
| 7,197,549 B1* | 3/2007 | Salama | ............... | H04L 61/5061 710/4 |
| 7,788,345 B1* | 8/2010 | Sukiman | ............. | H04L 61/5061 709/227 |
| 7,836,182 B1* | 11/2010 | Scano | ................. | H04L 61/5061 709/245 |
| 8,321,567 B1* | 11/2012 | Sheth | .................. | H04L 61/5061 709/224 |
| 9,813,374 B1 | 11/2017 | Magerramov et al. | | |
| 11,575,647 B1* | 2/2023 | Rubin-Smith | ...... | H04L 61/5061 |
| 2008/0101353 A1* | 5/2008 | Streijl | ................. | H04L 61/5061 370/389 |
| 2012/0226787 A1* | 9/2012 | Ait-Ameur | ......... | H04L 61/5061 709/224 |
| 2020/0186494 A1* | 6/2020 | X | ........................ | H04L 61/5061 |

FOREIGN PATENT DOCUMENTS

| | | |
|---|---|---|
| CN | 109428950 A | 3/2019 |
| EP | 2882167 B1 | 8/2019 |

OTHER PUBLICATIONS

Xie, Chongfeng, et al. "ARPIM: IP address resource pooling and intelligent management system for broadband IP networks." IEEE Communications Magazine 55.6 (2017): 55-61. (Year: 2017).*
Extended European Search Report for Application No. EP22205104, dated Jun. 1, 2023, 6 pages.

* cited by examiner

*Primary Examiner* — Vivek Srivastava
*Assistant Examiner* — William C McBeth
(74) *Attorney, Agent, or Firm* — Harrity & Harrity, LLP (57) ABSTRACT

A network device may maintain, for a user device, a pool domain into which address prefixes are allocated from a partition of an address pool management (APM) device, and may estimate, based on pool domain data, an average subscriber login rate for the pool domain by the user device. The network device may estimate, based on the pool domain data, an average response latency per apportionment alarm, and may calculate a dynamic apportionment threshold based on the average subscriber login rate for the pool domain and the average response latency per apportionment alarm. The network device may utilize the dynamic apportionment threshold for the user device.

20 Claims, 11 Drawing Sheets

DYNAMIC PREFIX APPORTIONMENT FOR ADDRESS POOL MANAGEMENT

BACKGROUND

At an edge of a network, service providers are responsible for dynamically assigning public Internet protocol (IP) addresses to user devices, such as customer premise equipment (CPE), in order for customer traffic to be routed to public destinations. As such, service providers must lease IP version 4 (IPv4) address space commensurate with a scale of a customer base.

SUMMARY

Some implementations described herein relate to a method. The method may include maintaining, for a user device, a pool domain into which address prefixes are allocated from a partition of an address pool management (APM) device, and estimating, based on pool domain data, an average subscriber login rate for the pool domain by the user device. The method may include estimating, based on the pool domain data, an average response latency per apportionment alarm, and calculating a dynamic apportionment threshold based on the average subscriber login rate for the pool domain and the average response latency per apportionment alarm. The method may include utilizing the dynamic apportionment threshold for the user device.

Some implementations described herein relate to a network device. The network device may include one or more memories and one or more processors. The one or more processors may be configured to maintain, for a user device, a pool domain into which address prefixes are allocated from a partition of an APM device, and estimate, based on pool domain data, an average subscriber login rate for the pool domain by the user device. The one or more processors may be configured to estimate, based on the pool domain data, an average response latency per apportionment alarm, and calculate a dynamic apportionment threshold based on the average subscriber login rate for the pool domain and the average response latency per apportionment alarm. The one or more processors may be configured to utilize the dynamic apportionment threshold for the user device, and calculate a quantity of prefixes to request from the APM device based on the dynamic apportionment threshold and a size of the pool domain. The one or more processors may be configured to utilize the quantity of prefixes for the user device.

Some implementations described herein relate to a non-transitory computer-readable medium that stores a set of instructions for a network device. The set of instructions, when executed by one or more processors of the network device, may cause the network device to maintain, for a user device, a pool domain into which address prefixes are allocated from a partition of an APM device, and estimate, based on pool domain data, an average subscriber login rate for the pool domain by the user device. The set of instructions, when executed by one or more processors of the network device, may cause the network device to estimate, based on the pool domain data, an average response latency per apportionment alarm, and calculate a dynamic apportionment threshold based on the average subscriber login rate for the pool domain and the average response latency per apportionment alarm. The set of instructions, when executed by one or more processors of the network device, may cause the network device to utilize the dynamic apportionment threshold for the user device, and determine that a quantity of free addresses for the pool domain is less than the dynamic apportionment threshold. The set of instructions, when executed by one or more processors of the network device, may cause the network device to provide an apportionment alarm to the APM device based on determining that the quantity of free addresses for the pool domain is less than the dynamic apportionment threshold.

DETAILED DESCRIPTION

The following detailed description of example implementations refers to the accompanying drawings. The same reference numbers in different drawings may identify the same or similar elements.

An APM device may allocate addresses to provider edge network devices (e.g., broadband network gateways (BNGs)) with just-in-time provisioning, and each provider edge network device may allocate addresses to multiple user devices (e.g., user plane device). Just-in-time provisioning depends on the provider edge network device communicating a state of address pool utilization with the APM device. When a quantity of available addresses on the provider edge network device is low, the APM device is called upon to add pool prefixes. When a quantity of available addresses on the provider edge network device is in surplus, the APM device is called upon to withdraw prefixes so they can be distributed to other provider edge network devices.

In order to avoid delays in customer session setup for the user devices, the provider edge network device mush request (e.g., from the APM) for provisioning of a pool prefix quickly enough to avoid depletion of the address pools. However, given the nature of various performance characteristics of the user devices, and performance characteristics of the provider edge network device, the provider edge network device may be unable to adequately apportion addresses for the user devices during certain conditions. Thus, current techniques for allocating addresses to user devices consume computing resources (e.g., processing resources, memory resources, communication resources, and/or the like), networking resources, and/or the like, associated with delaying traffic transmission through a network due to slow address allocation, losing traffic due to slow address allocation, handling lost traffic caused by slow address allocation, preventing traffic transmission by customers, and/or the like.

Some implementations described herein relate to a network device that provides dynamic prefix apportionment for address pool management. For example, a network device may maintain, for a user device, a pool domain into which address prefixes are allocated from a partition of an APM device, and may estimate, based on pool domain data, an average subscriber login rate for the pool domain by the user device. The network device may estimate, based on the pool domain data, an average response latency per apportionment alarm, and may calculate a dynamic apportionment threshold based on the average subscriber login rate for the pool domain and the average response latency per apportionment alarm. The network device may utilize the dynamic apportionment threshold for the user device, and may determine that a quantity of free addresses for the pool domain is less than the dynamic apportionment threshold. The network device may provide an apportionment alarm to the APM device based on determining that the quantity of free addresses for the pool domain is less than the dynamic apportionment threshold.

In this way, the network device provides dynamic prefix apportionment for address pool management. For example, a network device (e.g., a provider edge device) may provide a dynamic model that utilizes run-time data, such as subscriber login rates and APM apportionment alarm response times, to tune an apportionment threshold and a prefix count in real time. Thus, the network device conserves computing resources, networking resources, and/or that like that would otherwise have been consumed by delaying traffic transmission through a network due to slow address allocation, losing traffic or preventing customer logins due to slow address allocation, handling lost traffic caused by slow address allocation, preventing traffic transmission and logins by customers, and/or the like.

FIGS. 1A-1G are diagrams of an example 100 associated with providing dynamic prefix apportionment for address pool management. As shown in FIGS. 1A-1G, example 100 includes user devices, a network device, and an APM device. The network device may include a provider edge (PE) device, such as a BNG. The APM device may include a device that provisions the network device with addresses (e.g., IP addresses) for utilization by the user devices. Further details of the user devices, the network device, and the APM device are provided elsewhere herein. Although implementations are described in connection with a single user device, the implementations may be applied to all user devices managed by the network device.

Figure 1A:
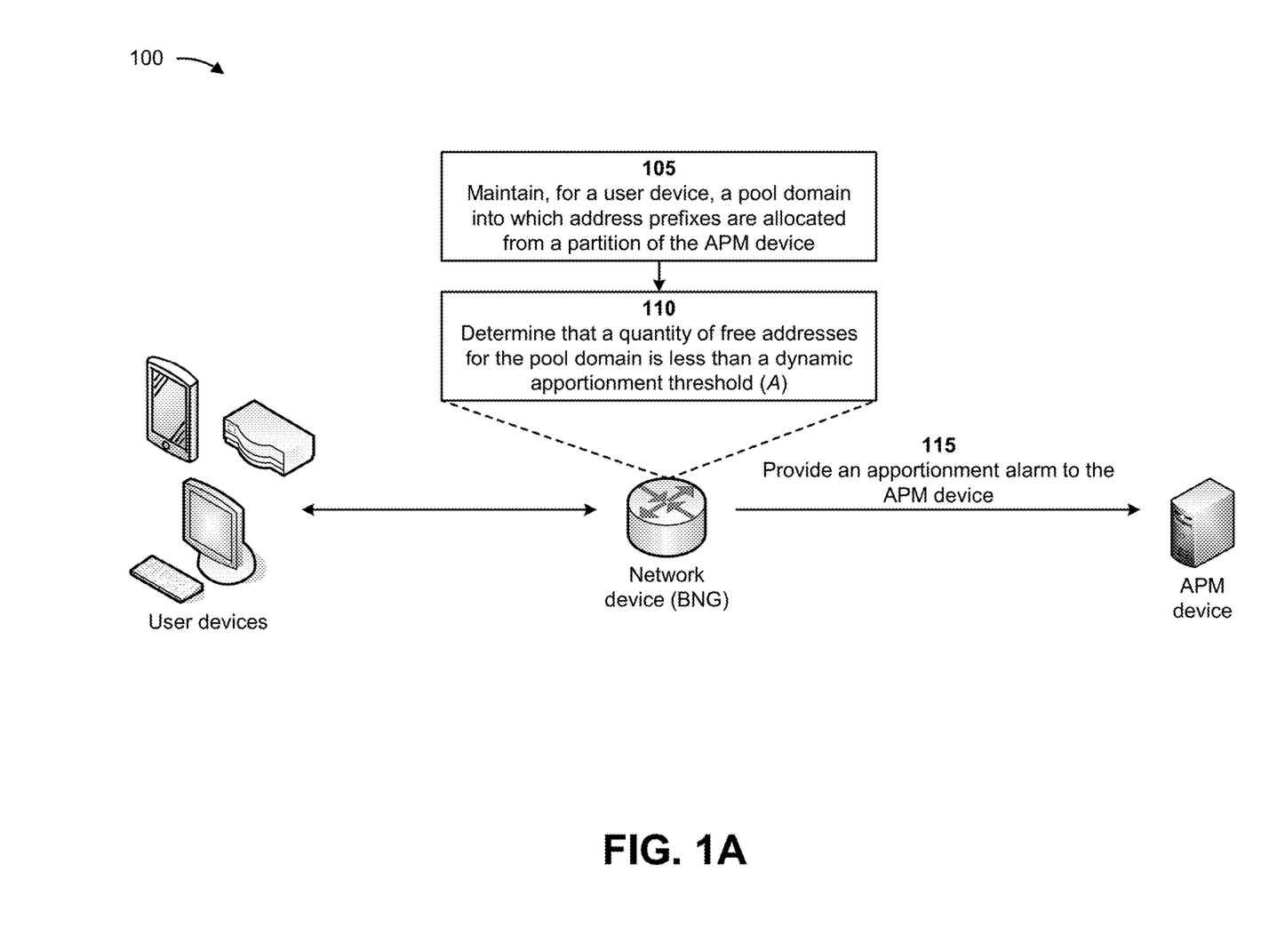
FIGS. 1A-1G are diagrams of an example associated with providing dynamic prefix apportionment for address pool management.

The network device may allocate addresses, to the user devices, from address pools. An address pool may include a name and a prefix. Address pools may be grouped into domains, where each domain defines an allocation context. Each domain may include associated parameters supplied by the APM device and/or the network device. For example, the parameters may include a parameter for an apportionment threshold (e.g., a threshold of available addresses below which the domain is considered in deficit and in need of additional pool prefixes), a parameter for a reclamation threshold (e.g., a threshold of available addresses above which the domain is considered to be in surplus and in need of withdrawal or removal of pool prefixes), a parameter for a preferred prefix length (e.g., a size of prefixes to add to the domain), a parameter for a source partition (e.g., a source partition guides the APM device from where to allocate pool prefixes), and/or the like.

As shown in FIG. 1A, and by reference number 105, the network device may maintain, for a user device, a pool domain into which address prefixes are allocated from a partition of the APM device. For example, the network device may manage one or more of the user devices. The network device may request a pool domain from the APM device for each user device managed by the network device. The APM device may allocate the pool domain to the network device based on the request. The pool domain may include address prefixes that are allocated to each user device (e.g., managed by the network device) from a partition of the APM device. The network device may maintain, for the user devices managed by the network device, pool domains into which address prefixes are allocated from partitions of the APM device.

As further shown in FIG. 1A, and by reference number 110, the network device may determine that a quantity of free addresses for the pool domain is less than a dynamic apportionment threshold (A). For example, the network device may determine a particular quantity of addresses utilized by the user device from the pool domain. The user device may utilize the quantity of addresses from the pool domain based on logins (e.g., calls) per second generated by the user device over time. The network device may subtract the particular quantity of addresses utilized by the user device from the allocated quantity of addresses in the pool domain to determine the quantity of free addresses for the pool domain. The network device may compare the quantity of free addresses and the dynamic apportionment threshold, and may determine that the quantity of free addresses for the pool domain is less than the dynamic apportionment threshold based on the comparison. Thus, the network device may determine that the pool domain needs additional pool prefixes allocated by the APM device based on determining that the quantity of free addresses for the pool domain is less than the dynamic apportionment threshold. Further details of calculating the dynamic apportionment threshold are provided elsewhere herein.

As further shown in FIG. 1A, and by reference number 115, the network device may provide an apportionment alarm to the APM device. For example, the network may generate an apportionment alarm based on determining that the quantity of free addresses for the pool domain is less than the dynamic apportionment threshold. The network device may provide the apportionment alarm to the APM device, and the APM device may allocate additional pool prefixes to the pool domain based on receiving the apportionment alarm. In some implementations, when the quantity of free addresses on the network device (e.g., for the pool domain) is less than the dynamic apportionment threshold, the network provides the apportionment alarm to the APM device. The APM device may respond to the apportionment alarm with a negative acknowledgement (e.g., a negative acknowledgement (NACK)) indicating that there are no more prefixes available for the pool domain, or with prefix-count quantity of new prefixes that the network device may absorb into the pool domain.

In some implementations, when the quantity of free addresses on the network device (e.g., for the pool domain) is greater than the reclamation threshold, the network device may provide a reclamation alarm to the APM device. The APM device may respond to the reclamation alarm with a drain command, followed by a delete once the pool is drained (e.g., which may result in the user devices for the pool domain being logged out).

Figure 1B:
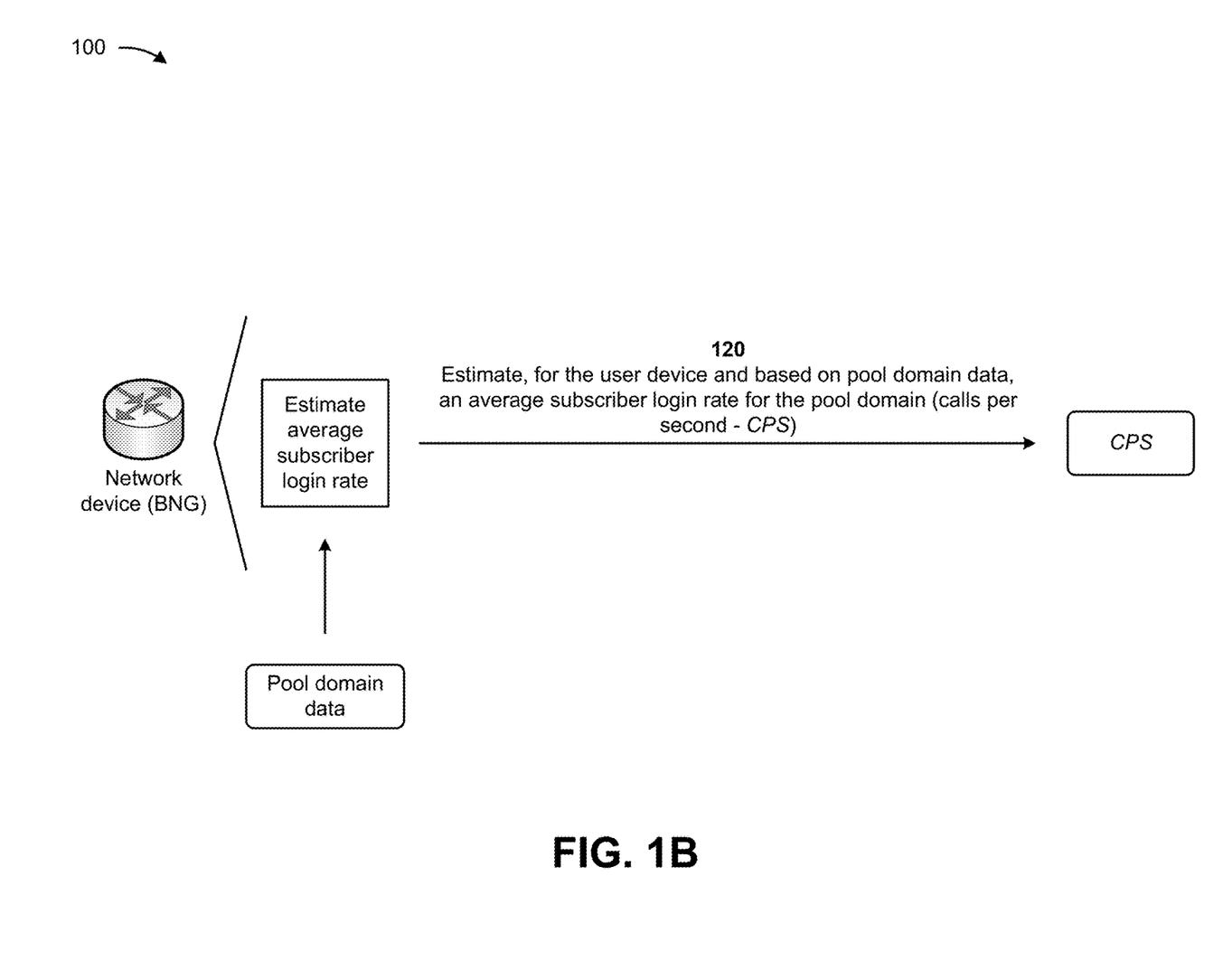

As shown in FIG. 1B, and by reference number 120, the network device may estimate, for the user device and based on pool domain data, an average subscriber login rate for the pool domain (e.g., calls per second—CPS). For example, the network device may maintain pool domain data associated with the pool domain. The pool domain data may include historical data identifying runtime data associated with the user device, a quantity of times the apportionment alarm is generated for the pool domain, a quantity of times the reclamation alarm is generated for the pool domain, a quantity of times the user device is not allocated an address, and/or the like. The network device may analyze the pool domain data, and may estimate the average subscriber (e.g., user device) login rate to the pool domain based on analyzing the pool domain data. In some implementations, the subscriber login rate may include a quantity of calls per second (CPS) by the user device. The estimated average subscriber login rate may provide a most reasonable prediction of when the network device may run out of addresses in the pool domain if no new prefixes are apportioned to the pool domain.

Figure 1C:
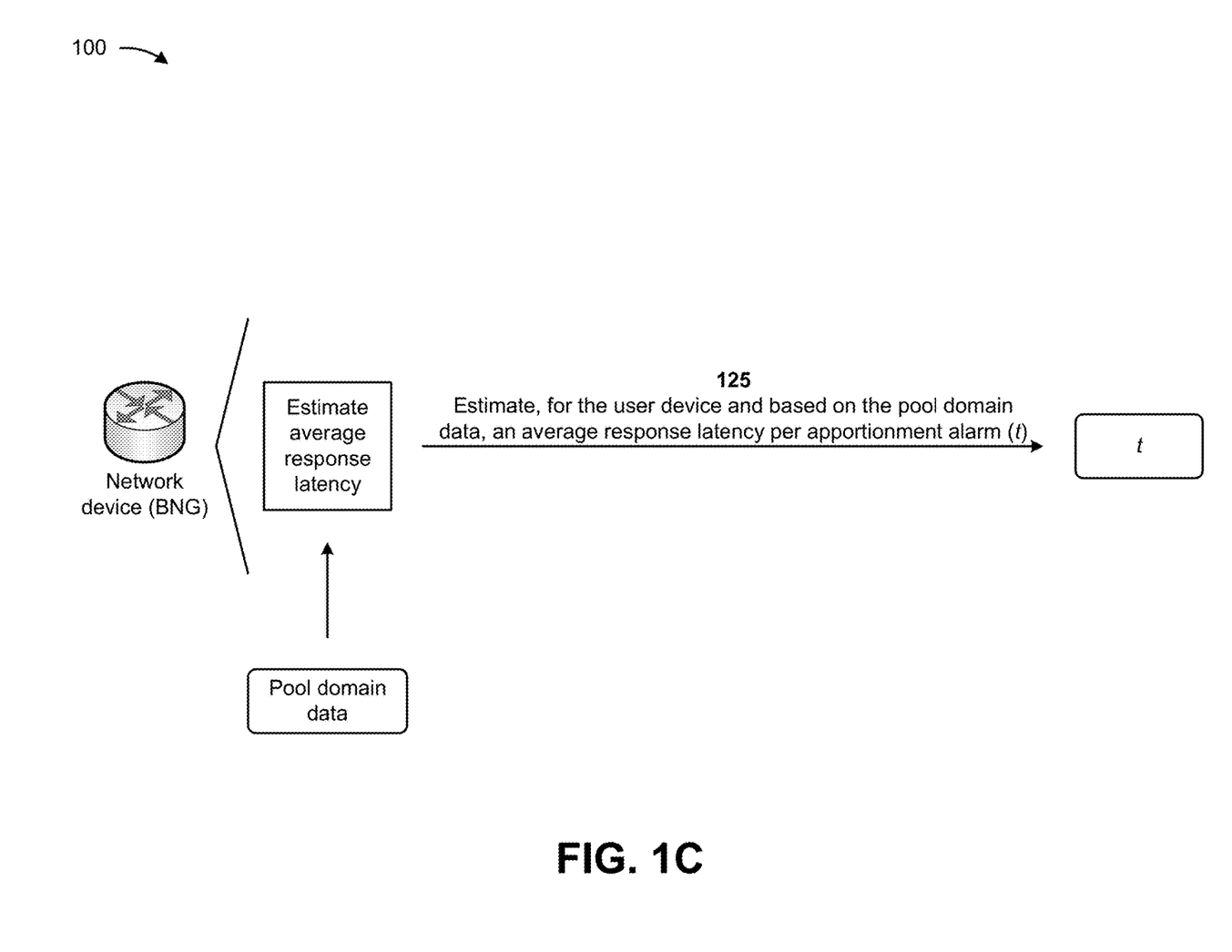

As shown in FIG. 1C, and by reference number 125, the network device may estimate, for the user device and based on the pool domain data, an average response latency per apportionment alarm (t). For example, the network device may analyze the pool domain data, and may estimate, for the user device, the average response latency per apportionment alarm (t) based on analyzing the pool domain data. The estimated average response latency per apportionment alarm may provide a most reasonable prediction of a time period required to receive new address prefixes from the APM device.

Figure 1D:
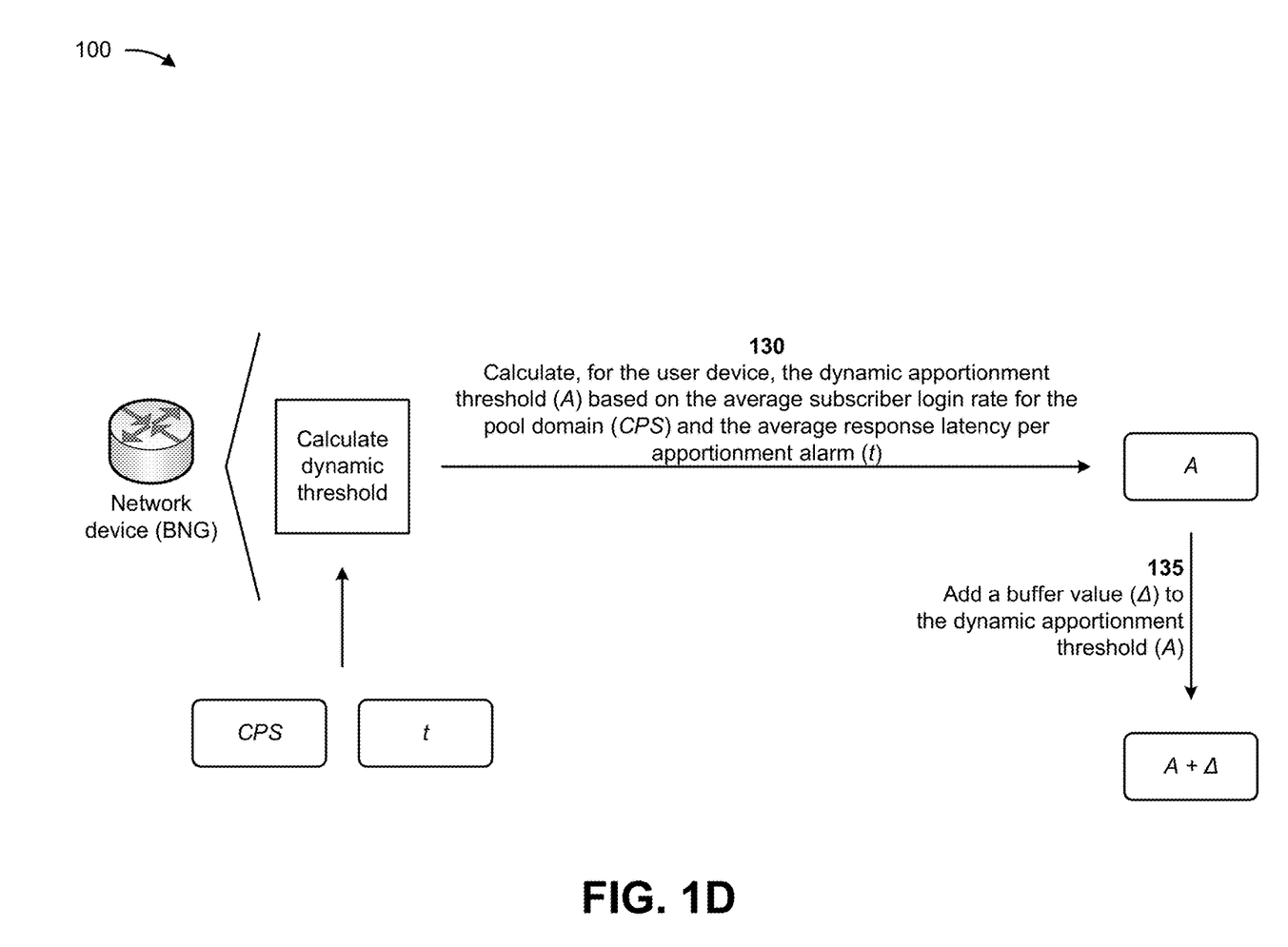

As shown in FIG. 1D, and by reference number 130, the network device may calculate, for the user device, the dynamic apportionment threshold (A) based on the average subscriber login rate for the pool domain (CPS) and the average response latency per apportionment alarm (t). For example, the network device may utilize the average subscriber login rate for the pool domain (C P S) and the average response latency per apportionment alarm (t) to calculate the dynamic apportionment threshold (A) for the user device. In some implementations, the network device may multiply the average subscriber login rate for the pool domain (CPS) and the average response latency per apportionment alarm (t) to generate a product that corresponds to the dynamic apportionment threshold (A) for the user device (e.g., A=CPS×t). In some implementations, the network device may utilize the dynamic apportionment threshold when determining whether the quantity of free addresses for the pool domain is less than the dynamic apportionment threshold and when determining whether to generate the apportionment alarm, as described above in connection with FIG. 1A.

As further shown in FIG. 1D, and by reference number 135, the network device may add a buffer value (A) to the dynamic apportionment threshold (A). For example, the network device may add the buffer value (A) to the dynamic apportionment threshold (A) to ensure that the network device is not frequently depleting the pool domain due to bursts of network traffic, processor utilization variance by the APM device, and/or the like. In some implementations, the buffer value may include a value within a range from about ten to about twenty. In some implementations, the network device may utilize the dynamic apportionment threshold and the buffer value when determining whether the quantity of free addresses for the pool domain is less than the dynamic apportionment threshold plus the buffer value and when determining whether to generate the apportionment alarm, as described above in connection with FIG. 1A.

Figure 1E:
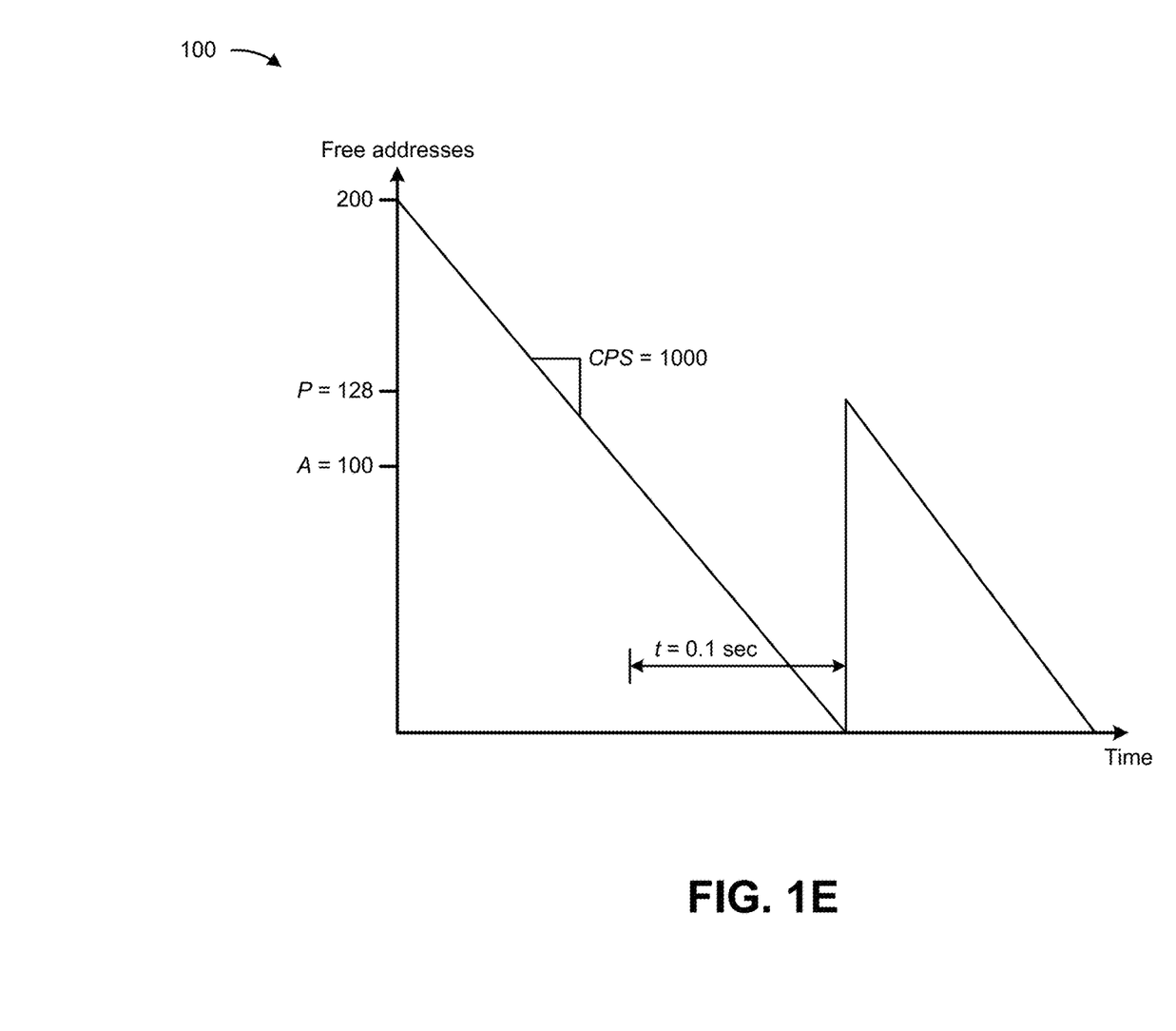

FIG. 1E depicts an example of utilization of free addresses of the pool domain by the network device over time. As shown, a size of the pool domain (P) may include one hundred twenty-eight (128) free addresses, the average subscriber login rate for the pool domain (CPS) may be one thousand (1,000) logins per second, and the average response latency per apportionment alarm (t) may be 0.1 seconds. Thus, the dynamic apportionment threshold (A) for the user device may be (e.g., A=CPS×t or 1,000×0.1=100) one hundred free addresses. When the quantity of free addresses drops below the dynamic apportionment threshold (A), the network device may receive additional free addresses up to the size of the pool domain (P) of one hundred twenty-eight (128) additional addresses.

Figure 1F:
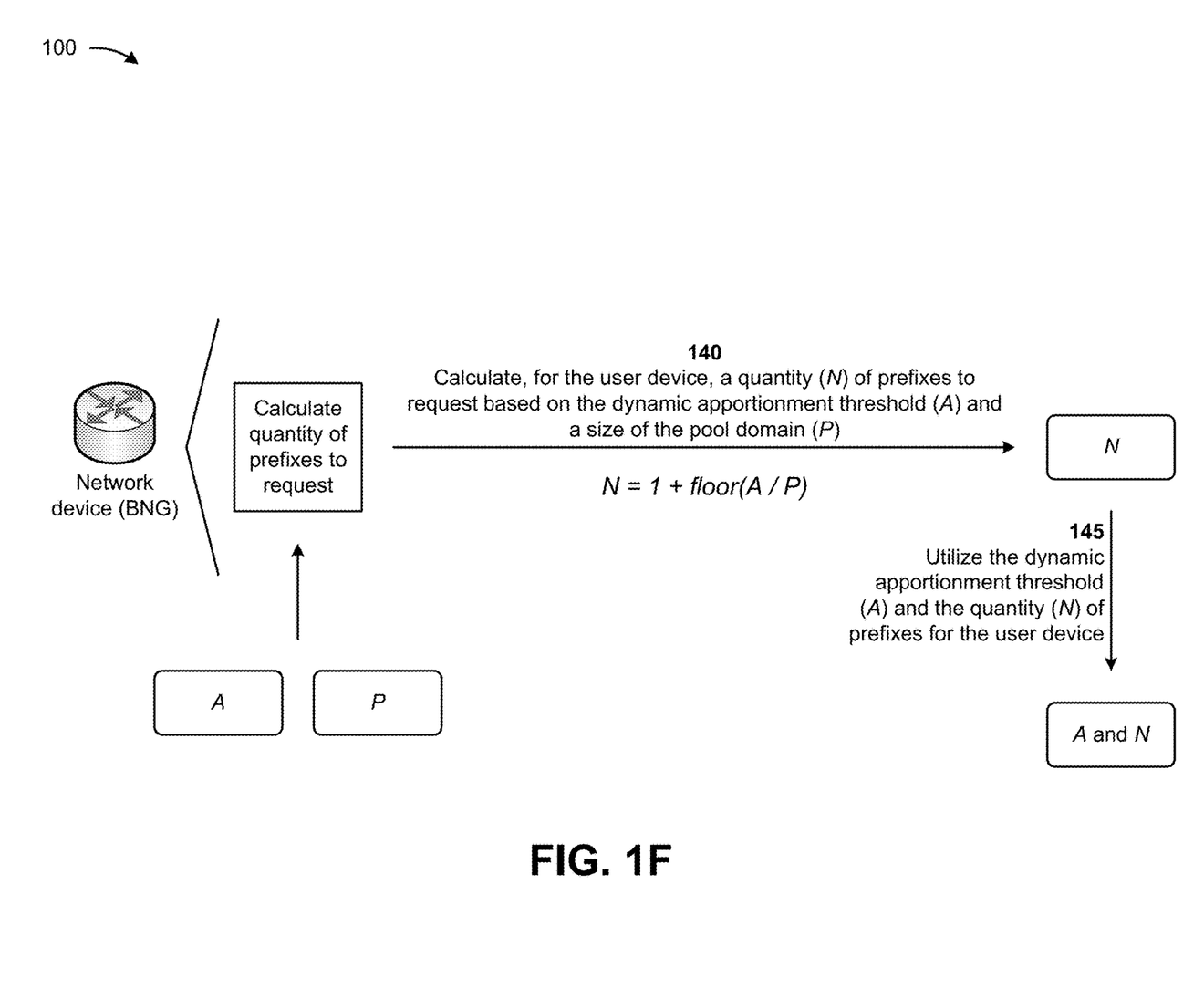

As shown in FIG. 1F, and by reference number 140, the network device may calculate, for the user device, a quantity (N) of prefixes to request based on the dynamic apportionment threshold (A) and a size of the pool domain (P). For example, when the average subscriber login rate for the pool domain (CPS) satisfies a threshold level (e.g., is very high due to bursts of network traffic), and/or the APM device is using small pool sizes (e.g., 24-bits), the APM device may need to provide more than one prefix per apportionment alarm in order to keep up with the average subscriber login rate for the pool domain (CPS). In some implementations, when the network device generates an apportionment alarm, the network device may calculate, for the user device, the quantity (N) of prefixes to request based on the dynamic apportionment threshold (A) and a size of the pool domain (P). The quantity (N) of prefixes to request may be calculated as follows: N=1+floor(A/P), where floor indicates to round down to a nearest whole integer.

As further shown in FIG. 1F, and by reference number 145, the network device may utilize the dynamic apportionment threshold (A) and the quantity (N) of prefixes requested for the user device. For example, the network device may utilize the dynamic apportionment threshold when determining whether the quantity of free addresses for the pool domain is less than the dynamic apportionment threshold and when determining whether to generate the apportionment alarm, as described above in connection with FIG. 1A. The network device may utilize the quantity of prefixes when requesting prefixes from the APM device, due to an apportionment alarm, when the average subscriber login rate for the pool domain (CPS) satisfies the threshold level and/or the APM device is using small pool sizes.

Figure 1G:
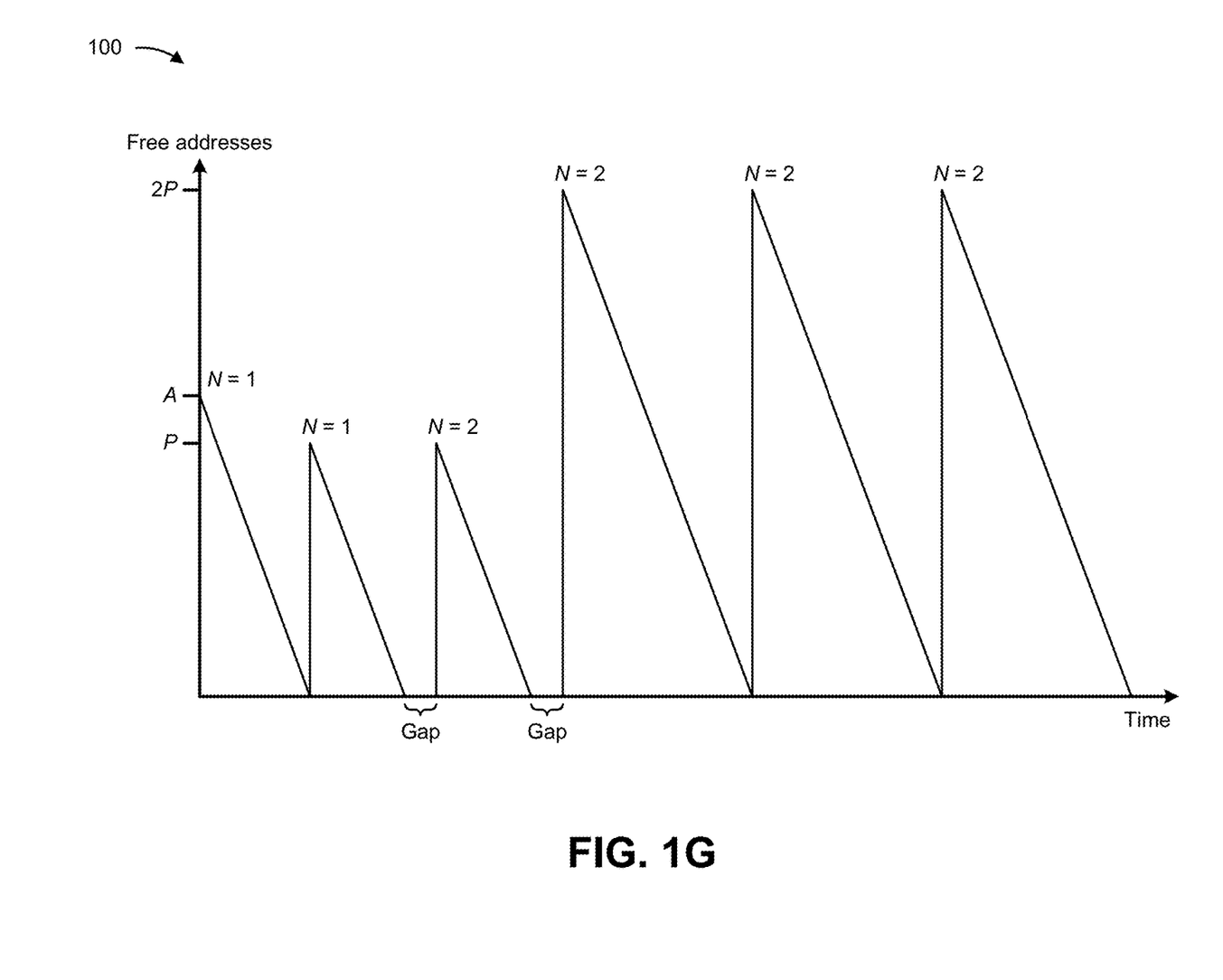

FIG. 1G depicts an example of utilization of free addresses of the pool domain by the network device over time. As shown, the size of the pool domain (P) may be less than the dynamic apportionment threshold (A), and the quantity (N) of prefixes requested is originally set to one for the first two apportionment alarms. However, with the quantity (N) set to one, the network device may run out free addresses sooner than the APM device can respond, as shown by the gaps in FIG. 1G. During the gaps, no customers can log in (e.g., due to lack of free addresses), resulting in a poor customer experience. If the network device sets the quantity (N) of prefixes requested to two, the network device may not run out of free addresses and may eliminate the gaps.

In this way, the network device provides dynamic prefix apportionment for address pool management. For example, a network device (e.g., a provider edge device) may provide a dynamic model that utilizes run-time data, such as subscriber login rates and APM apportionment alarm response times, to tune an apportionment threshold and a prefix count in real time. Thus, the network device conserves computing resources, networking resources, and/or that like that would otherwise have been consumed by delaying traffic transmission through a network due to slow address allocation, losing traffic or preventing customer logins due to slow address allocation, handling lost traffic caused by slow address allocation, preventing traffic transmission and logins by customers, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
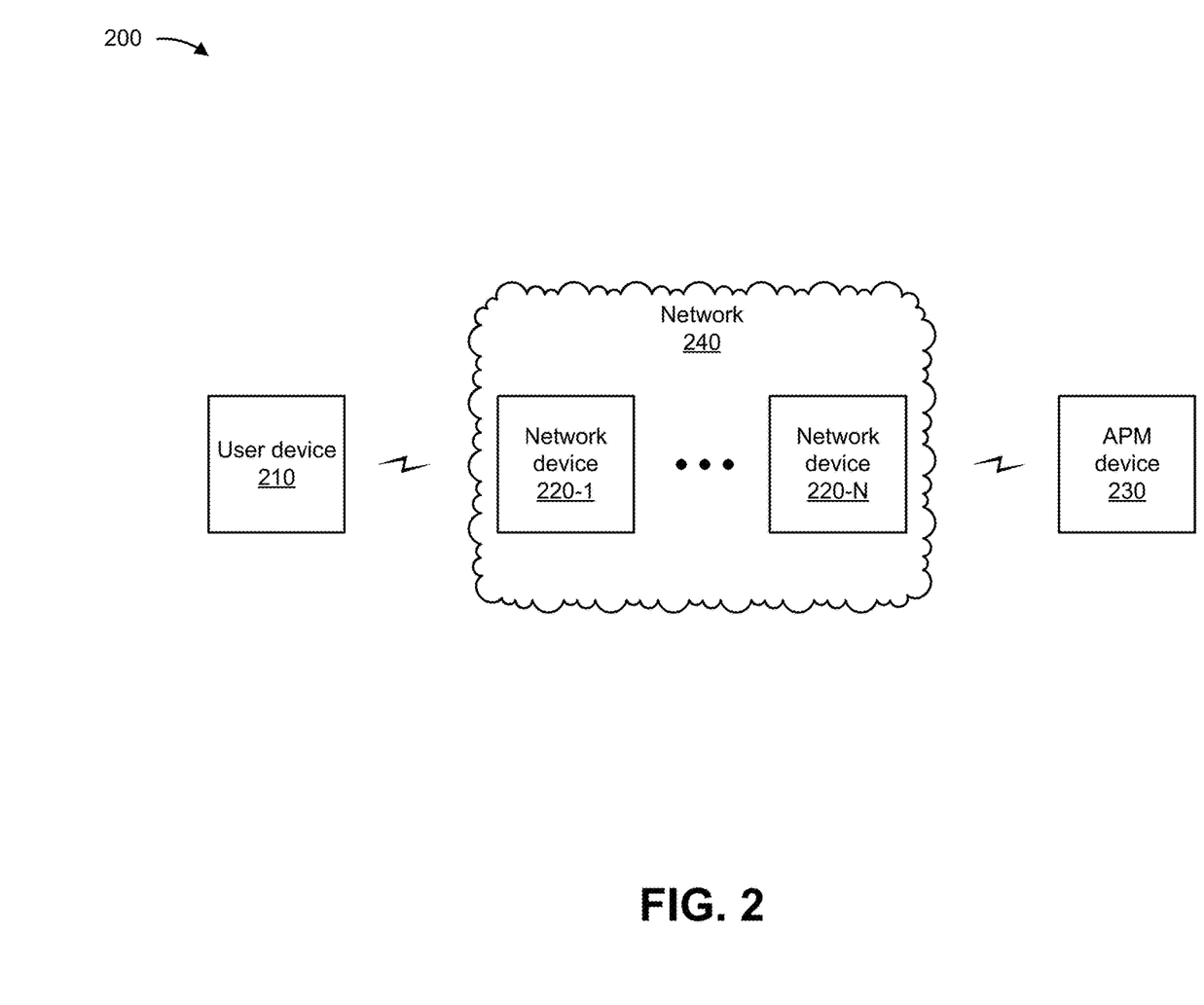
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a user device 210, a group of network devices 220 (shown as network device 220-1 through network device 220-N), an APM device 230, and a network 240. Devices of the environment 200 may interconnect via wired connections, wireless connections, or a combination of wired and wireless connections.

The user device 210 may include one or more devices capable of receiving, generating, storing, processing, and/or providing information, as described elsewhere herein. The user device 210 may include a communication device and/or a computing device. For example, the user device 210 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device. In some implementations, the user device 210 may receive network traffic from and/or may provide network traffic to other user devices 210 and/or the APM device 230, via the network 240 (e.g., by routing packets using the network devices 220 as intermediaries).

The network device 220 includes one or more devices capable of receiving, processing, storing, routing, and/or providing traffic (e.g., a packet or other information or metadata) in a manner described herein. For example, the network device 220 may include a router, such as a label switching router (LSR), a label edge router (LER), an ingress router, an egress router, a provider router (e.g., a provider edge router or a provider core router), a virtual router, a route reflector, an area border router, or another type of router. Additionally, or alternatively, the network device 220 may include a gateway, a switch, a firewall, a hub, a bridge, a reverse proxy, a server (e.g., a proxy server, a cloud server, or a data center server), a load balancer, and/or a similar device. In some implementations, the network device 220 may be a physical device implemented within a housing, such as a chassis. In some implementations, the network device 220 may be a virtual device implemented by one or more computer devices of a cloud computing environment or a data center. In some implementations, a group of network devices 220 may be a group of data center nodes that are used to route traffic flow through the network 240.

The APM device 230 may include one or more devices capable of receiving, generating, storing, processing, providing, and/or routing information, as described elsewhere herein. The APM device 230 may include a communication device and/or a computing device. For example, the APM device 230 may include a server, such as an application server, a client server, a web server, a database server, a host server, a proxy server, a virtual server (e.g., executing on computing hardware), or a server in a cloud computing system. In some implementations, the APM device 230 may include computing hardware used in a cloud computing environment. In some implementations, the APM device 230 may receive information from and/or transmit information to the user device 210, via the network 240 (e.g., by routing packets using the network devices 220 as intermediaries).

The network 240 includes one or more wired and/or wireless networks. For example, the network 240 may include a packet switched network, a cellular network (e.g., a fifth generation (5G) network, a fourth generation (4G) network, such as a long-term evolution (LTE) network, a third generation (3G) network, and/or the like), a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
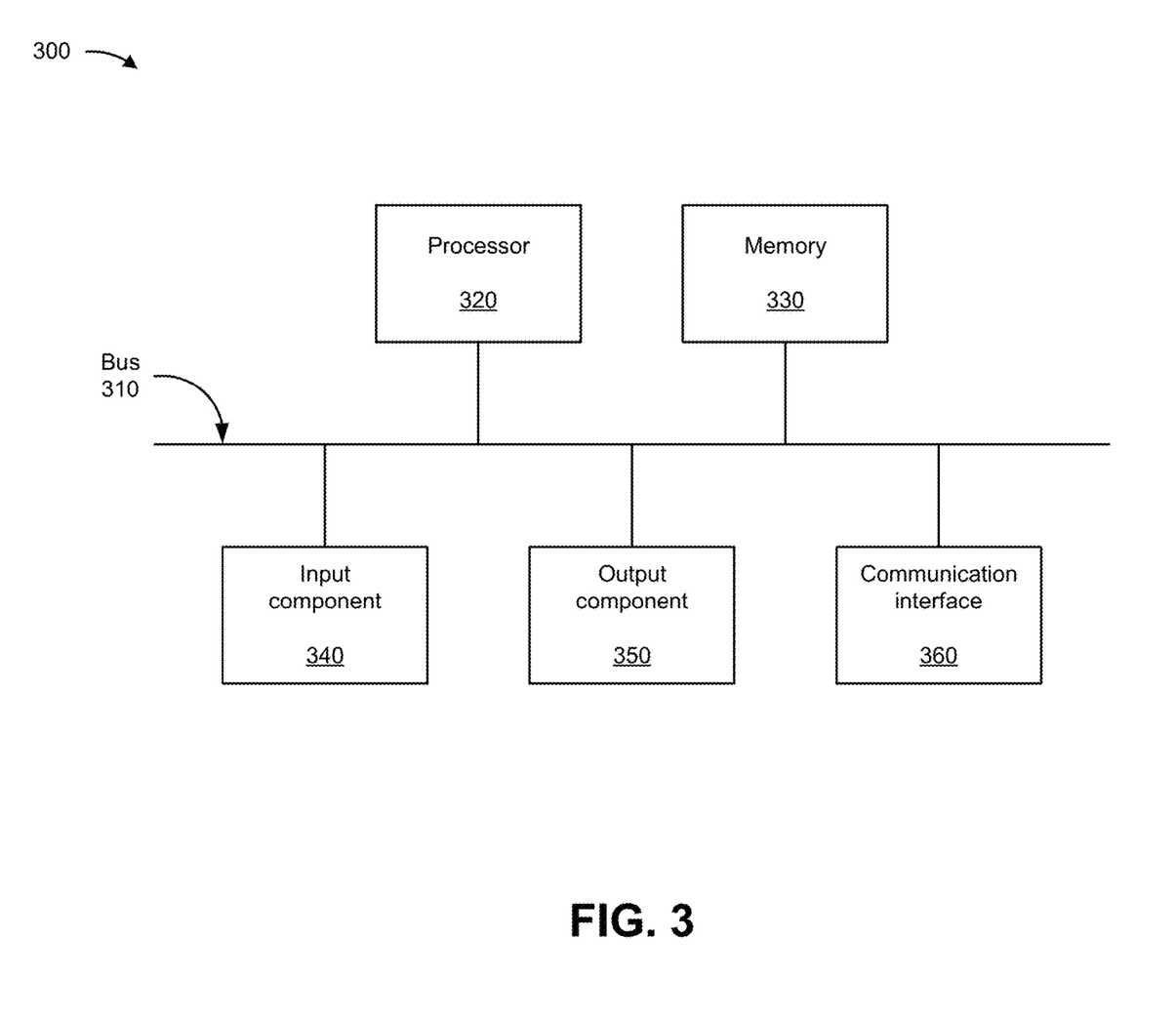
FIGS. 3 and 4 are diagrams of example components of one or more devices of FIG. 2.

FIG. 3 is a diagram of example components of one or more devices of FIG. 2. The example components may be included in a device 300, which may correspond to the user device 210, the network device 220, and/or the APM device 230. In some implementations, the user device 210, the network device 220, and/or the APM device 230 may include one or more devices 300 and/or one or more components of the device 300. As shown in FIG. 3, the device 300 may include a bus 310, a processor 320, a memory 330, an input component 340, an output component 350, and a communication interface 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication interface 360 enables the device 300 to communicate with other devices via a wired connection and/or a wireless connection. For example, the communication interface 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
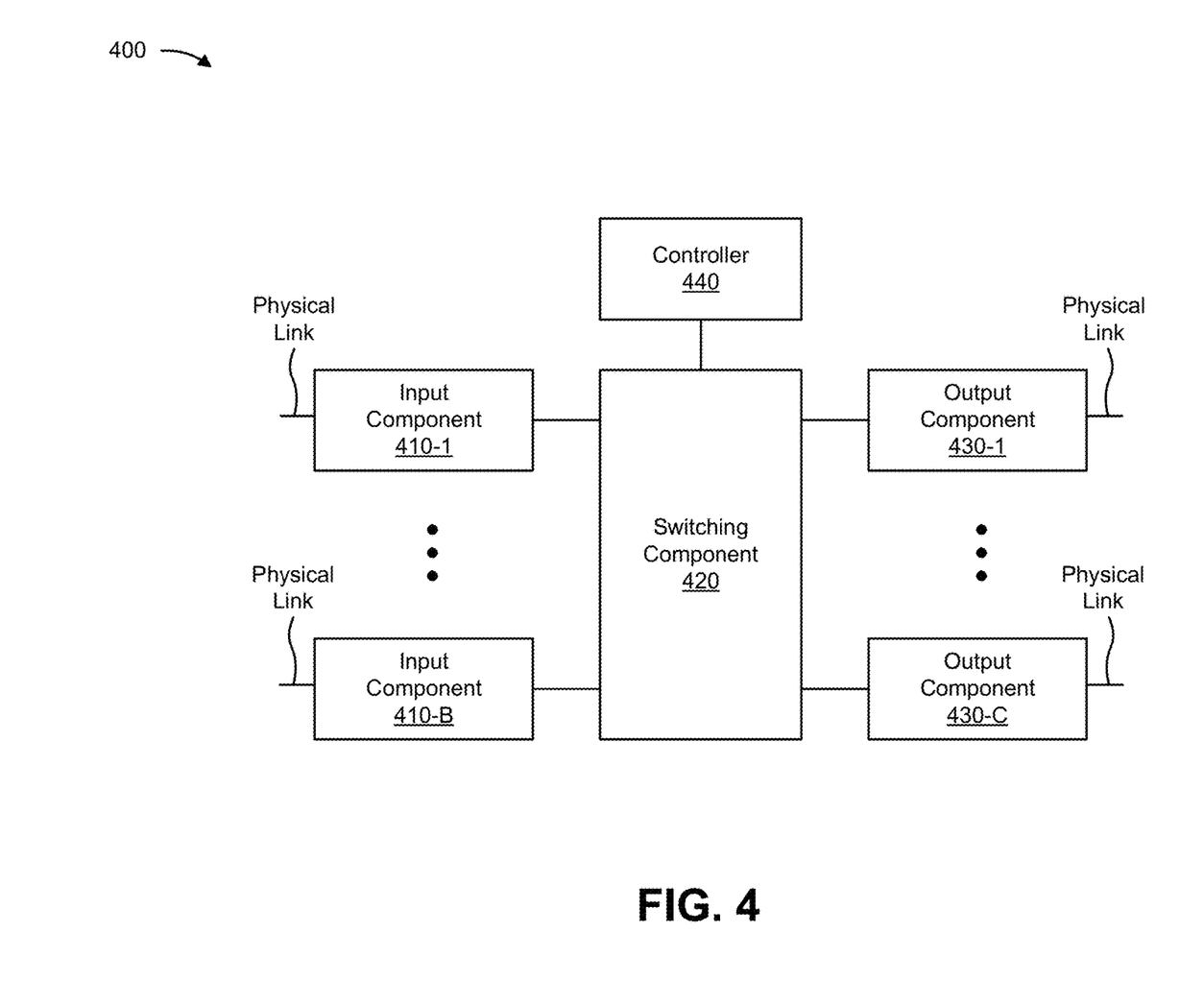

FIG. 4 is a diagram of example components of one or more devices of FIG. 2. The example components may be included in a device 400. The device 400 may correspond to the network device 220. In some implementations, the network device 220 may include one or more devices 400 and/or one or more components of the device 400. As shown in FIG. 4, the device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

The input component 410 may be one or more points of attachment for physical links and may be one or more points of entry for incoming traffic, such as packets. The input component 410 may process incoming traffic, such as by performing data link layer encapsulation or decapsulation. In some implementations, the input component 410 may transmit and/or receive packets. In some implementations, the input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, the device 400 may include one or more input components 410.

The switching component 420 may interconnect the input components 410 with the output components 430. In some implementations, the switching component 420 may be implemented via one or more crossbars, via busses, and/or with shared memories. The shared memories may act as temporary buffers to store packets from the input components 410 before the packets are eventually scheduled for delivery to the output components 430. In some implementations, the switching component 420 may enable the input components 410, the output components 430, and/or the controller 440 to communicate with one another.

The output component 430 may store packets and may schedule packets for transmission on output physical links. The output component 430 may support data link layer encapsulation or decapsulation, and/or a variety of higher-level protocols. In some implementations, the output component 430 may transmit packets and/or receive packets. In some implementations, the output component 430 may include an output line card that includes one or more packet processing components (e.g., in the form of integrated circuits), such as one or more IFCs, packet forwarding components, line card controller components, output ports, processors, memories, and/or output queues. In some implementations, the device 400 may include one or more output components 430. In some implementations, the input component 410 and the output component 430 may be implemented by the same set of components (e.g., and input/output component may be a combination of the input component 410 and the output component 430).

The controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, the controller 440 may include one or more processors that can be programmed to perform a function.

In some implementations, the controller 440 may include a RAM, a ROM, and/or another type of dynamic or static storage device (e.g., a flash memory, a magnetic memory, an optical memory, etc.) that stores information and/or instructions for use by the controller 440.

In some implementations, the controller 440 may communicate with other devices, networks, and/or systems connected to the device 400 to exchange information regarding network topology. The controller 440 may create routing tables based on the network topology information, may create forwarding tables based on the routing tables, and may forward the forwarding tables to the input components 410 and/or output components 430. The input components 410 and/or the output components 430 may use the forwarding tables to perform route lookups for incoming and/or outgoing packets.

The controller 440 may perform one or more processes described herein. The controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with the controller 440 from another computer-readable medium or from another device via a communication interface. When executed, software instructions stored in a memory and/or storage component associated with the controller 440 may cause the controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, the device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
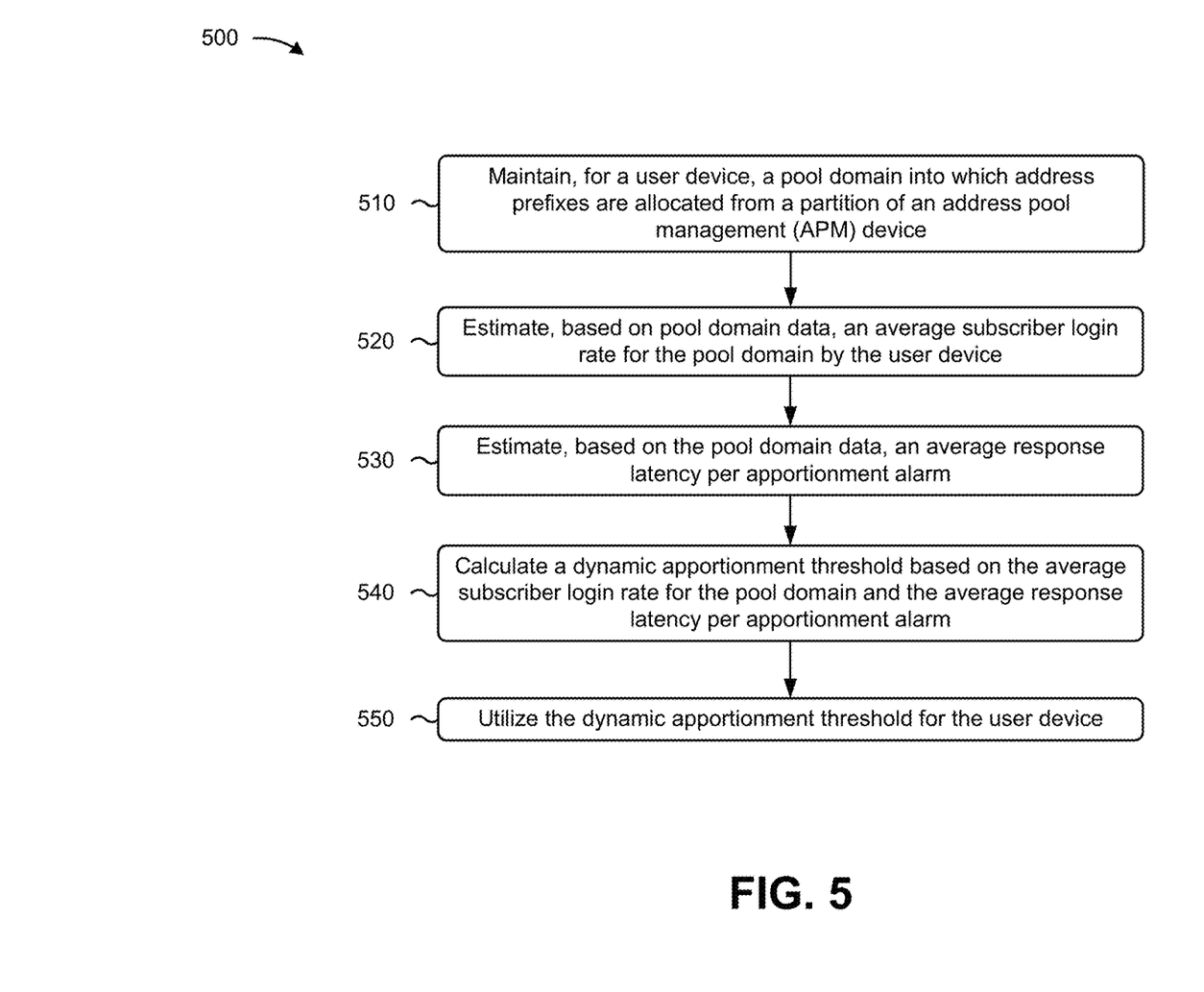
FIG. 5 is a flowchart of an example process for providing dynamic prefix apportionment for address pool management.

FIG. 5 is a flowchart of an example process 500 for providing dynamic prefix apportionment for address pool management. In some implementations, one or more process blocks of FIG. 5 may be performed by a network device (e.g., the network device 220). In some implementations, one or more process blocks of FIG. 5 may be performed by another device or a group of devices separate from or including the network device, such as a user device (e.g., the user device 210) and/or an APM device (e.g., the APM device 230). Additionally, or alternatively, one or more process blocks of FIG. 5 may be performed by one or more components of the device 300, such as the processor 320, the memory 330, the input component 340, the output component 350, and/or the communication interface 360. Additionally, or alternatively, one or more process blocks of FIG. 5 may be performed by one or more components of the device 400, such as the input component 410, the switching component 420, the output component 430, and/or the controller 440.

As shown in FIG. 5, process 500 may include maintaining, for a user device, a pool domain into which address prefixes are allocated from a partition of an APM device (block 510). For example, the network device may maintain, for a user device, a pool domain into which address prefixes are allocated from a partition of an APM device, as described above. In some implementations, the network device is a broadband network gateway.

As further shown in FIG. 5, process 500 may include estimating, based on pool domain data, an average subscriber login rate for the pool domain by the user device (block 520). For example, the network device may estimate, based on pool domain data, an average subscriber login rate for the pool domain by the user device, as described above. In some implementations, the pool domain data includes runtime data associated with the user device.

As further shown in FIG. 5, process 500 may include estimating, based on the pool domain data, an average response latency per apportionment alarm (block 530). For example, the network device may estimate, based on the pool domain data, an average response latency per apportionment alarm, as described above. In some implementations, the average response latency per apportionment alarm provides an indication of a time period required to receive new address prefixes from the APM device.

As further shown in FIG. 5, process 500 may include calculating a dynamic apportionment threshold based on the average subscriber login rate for the pool domain and the average response latency per apportionment alarm (block 540). For example, the network device may calculate a dynamic apportionment threshold based on the average subscriber login rate for the pool domain and the average response latency per apportionment alarm, as described above. In some implementations, calculating the dynamic apportionment threshold includes multiplying the average subscriber login rate for the pool domain and the average response latency per apportionment alarm to calculate the dynamic apportionment threshold.

As further shown in FIG. 5, process 500 may include utilizing the dynamic apportionment threshold for the user device (block 550). For example, the network device may utilize the dynamic apportionment threshold for the user device, as described above.

In some implementations, process 500 includes determining that a quantity of free addresses for the pool domain is less than the dynamic apportionment threshold, and providing an apportionment alarm to the APM device based on determining that the quantity of free addresses for the pool domain is less than the dynamic apportionment threshold. In some implementations, process 500 includes receiving, from the APM device, one or more new address prefixes based on providing the apportionment alarm to the APM device, and adding the one or more new address prefixes to the pool domain. In some implementations, process 500 includes receiving, from the APM device and based on providing the apportionment alarm to the APM device, a message indicating that no new address prefixes are available for the pool domain.

In some implementations, process 500 includes calculating a quantity of prefixes to request from the APM device based on the dynamic apportionment threshold and a size of the pool domain, and utilizing the quantity of prefixes for the user device. In some implementations, calculating the quantity of prefixes to request from the APM device includes dividing the dynamic apportionment threshold by the size of the pool domain to generate a result, calculating a floor of the result, and adding a value of one to the floor of the result to calculate the quantity of prefixes to request from the APM device.

In some implementations, process 500 includes adding a buffer value to the dynamic apportionment threshold, and utilizing the dynamic apportionment threshold and the added buffer value for the user device. In some implementations, the buffer value is within a range from ten to twenty.

In some implementations, process 500 includes maintaining, for another user device, another pool domain into which address prefixes are allocated from another partition of the APM device; estimating, based on other pool domain data, another average subscriber login rate for the other pool domain by the other user device; estimating, based on the other pool domain data, another average response latency per apportionment alarm; calculating another dynamic apportionment threshold based on the other average subscriber login rate for the other pool domain and the other average response latency per apportionment alarm; and utilizing the other dynamic apportionment threshold for the other user device.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   maintaining, by a network device and for a user device, a pool domain into which address prefixes are allocated from a partition of an address pool management (APM) device;
   estimating, by the network device and based on pool domain data, an average subscriber login rate for the pool domain by the user device;
   estimating, by the network device and based on the pool domain data, an average response latency per apportionment alarm;
   calculating, by the network device, a dynamic apportionment threshold based on the average subscriber login rate for the pool domain and the average response latency per apportionment alarm;
   calculating, by the network device and based on the dynamic apportionment threshold and a size of the pool domain, a quantity of prefixes to request from the APM device; and
   utilizing, by the network device, the quantity of prefixes for the user device.

2. The method of claim 1, further comprising:
   determining that a quantity of free addresses for the pool domain is less than the dynamic apportionment threshold; and
   providing an apportionment alarm to the APM device based on determining that the quantity of free addresses for the pool domain is less than the dynamic apportionment threshold.

3. The method of claim 2, further comprising:
   receiving, from the APM device, one or more new address prefixes based on providing the apportionment alarm to the APM device; and
   adding the one or more new address prefixes to the pool domain.

4. The method of claim 2, further comprising:
   receiving, from the APM device and based on providing the apportionment alarm to the APM device, a message indicating that no new address prefixes are available for the pool domain.

5. The method of claim 1, wherein calculating the quantity of prefixes to request from the APM device comprises:
   dividing the dynamic apportionment threshold by the size of the pool domain to generate a result;
   calculating a floor of the result; and
   adding a value of one to the floor of the result to calculate the quantity of prefixes to request from the APM device.

6. The method of claim 1, wherein calculating the dynamic apportionment threshold comprises:
   multiplying the average subscriber login rate for the pool domain and the average response latency per apportionment alarm to calculate the dynamic apportionment threshold.

7. The method of claim 1, further comprising:
   adding a buffer value to the dynamic apportionment threshold.

8. The method of claim 1, further comprising:
   generating, based on a reclamation alarm, a drain command associated with a pool related to the pool domain.

9. A network device, comprising:
   one or more memories; and
   one or more processors to:
      maintain, for a user device, a pool domain into which address prefixes are allocated from a partition of an address pool management (APM) device;
      estimate, based on pool domain data, an average subscriber login rate for the pool domain by the user device;
      estimate, based on the pool domain data, an average response latency per apportionment alarm;

calculate a dynamic apportionment threshold based on the average subscriber login rate for the pool domain and the average response latency per apportionment alarm;

utilize the dynamic apportionment threshold for the user device;

calculate a quantity of prefixes to request from the APM device based on the dynamic apportionment threshold and a size of the pool domain; and utilize the quantity of prefixes for the user device.

10. The network device of claim 9, wherein the network device is a broadband network gateway.

11. The network device of claim 9, wherein the pool domain data includes runtime data associated with the user device.

12. The network device of claim 9, wherein the one or more processors are further to:

add a buffer value to the dynamic apportionment threshold; and utilize the dynamic apportionment threshold and the added buffer value for the user device.

13. The network device of claim 12, wherein the buffer value is within a range from ten to twenty.

14. The network device of claim 9, wherein the one or more processors are further to:

maintain, for another user device, another pool domain into which address prefixes are allocated from another partition of the APM device;

estimate, based on other pool domain data, another average subscriber login rate for the other pool domain by the other user device;

estimate, based on the other pool domain data, another average response latency per apportionment alarm;

calculate another dynamic apportionment threshold based on the other average subscriber login rate for the other pool domain and the other average response latency per apportionment alarm; and utilize the other dynamic apportionment threshold for the other user device.

15. The network device of claim 9, wherein the average response latency per apportionment alarm provides an indication of a time period required to receive new address prefixes from the APM device.

16. A non-transitory computer-readable medium storing a set of instructions, the set of instructions comprising:

one or more instructions that, when executed by one or more processors of a network device, cause the network device to:

maintain, for a user device, a pool domain into which address prefixes are allocated from a partition of an address pool management (APM) device;

estimate, based on pool domain data, an average subscriber login rate for the pool domain by the user device;

estimate, based on the pool domain data, an average response latency per apportionment alarm;

calculate a dynamic apportionment threshold based on multiplying the average subscriber login rate for the pool domain and the average response latency per apportionment alarm;

utilize the dynamic apportionment threshold for the user device;

determine that a quantity of free addresses for the pool domain is less than the dynamic apportionment threshold; and provide an apportionment alarm to the APM device based on determining that the quantity of free addresses for the pool domain is less than the dynamic apportionment threshold.

17. The non-transitory computer-readable medium of claim 16, wherein the one or more instructions further cause the network device to:

receive, from the APM device, one or more new address prefixes based on providing the apportionment alarm to the APM device; and add the one or more new address prefixes to the pool domain.

18. The non-transitory computer-readable medium of claim 16, wherein the one or more instructions further cause the network device to:

receive, from the APM device and based on providing the apportionment alarm to the APM device, a message indicating that no new address prefixes are available for the pool domain.

19. The non-transitory computer-readable medium of claim 16, wherein the one or more instructions further cause the network device to:

calculate a quantity of prefixes to request from the APM device based on the dynamic apportionment threshold and a size of the pool domain; and utilize the quantity of prefixes for the user device.

20. The non-transitory computer-readable medium of claim 19, wherein the one or more instructions, that cause the network device to calculate the quantity of prefixes to request from the APM device, cause the network device to:

divide the dynamic apportionment threshold by the size of the pool domain to generate a result;

calculate a floor of the result; and add a value of one to the floor of the result to calculate the quantity of prefixes to request from the APM device.

* * * * *